(12) United States Patent
Chen et al.

(10) Patent No.: US 12,022,944 B2
(45) Date of Patent: Jul. 2, 2024

(54) FURNITURE AND FURNITURE PART ASSEMBLY THEREOF

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Fang-Cheng Su, Kaohsiung (TW); Yue-Hua Tang, Kaohsiung (TW); Chun-Chiang Wang, Kaohsiung (TW)

(73) Assignees: King Slide Works Co., Ltd., Kaohsiung (TW); King Slide Technology Co., Ltd., Kaohsiung (TW)

( * ) Notice: Subject to any disclaimer, the term of this patent is extended or adjusted under 35 U.S.C. 154(b) by 0 days.

(21) Appl. No.: 18/059,518

(22) Filed: Nov. 29, 2022

(65) Prior Publication Data
US 2024/0000230 A1 Jan. 4, 2024

(30) Foreign Application Priority Data

Jul. 4, 2022 (TW) .................................. 111125247

(51) Int. Cl.
| | |
|---|---|
| *A47B 88/00* | (2017.01) |
| *A47B 47/00* | (2006.01) |
| *A47B 88/90* | (2017.01) |
| *A47B 88/925* | (2017.01) |
| *A47B 88/95* | (2017.01) |
| *A47B 88/956* | (2017.01) |
| *F16B 5/00* | (2006.01) |

(52) U.S. Cl.
CPC ........ *A47B 88/941* (2017.01); *A47B 47/0075* (2013.01); *A47B 88/925* (2017.01); *A47B 88/95* (2017.01); *A47B 88/956* (2017.01); *A47B 2088/902* (2017.01); *F16B 5/0056* (2013.01)

(58) Field of Classification Search
CPC ... A47B 47/0075; A47B 88/941; A47B 88/95; A47B 88/956; A47B 88/925; A47B 2088/902; F16B 5/0056
See application file for complete search history.

(56) References Cited

U.S. PATENT DOCUMENTS

| | | | | |
|---|---|---|---|---|
| 9,161,624 B2 * | 10/2015 | Haemmerle | ............ | A47B 88/40 |
| 9,456,690 B2 * | 10/2016 | Feuerstein | ............ | A47B 88/941 |
| 10,772,421 B2 * | 9/2020 | Kampl | ................... | A47B 88/46 |
| 10,966,523 B2 * | 4/2021 | Kampl | ................... | F16B 12/46 |
| 11,122,895 B2 * | 9/2021 | Kampl | ................. | A47B 88/938 |
| 2011/0221318 A1 * | 9/2011 | Chen | ..................... | A47B 88/941 |
| | | | | 312/263 |

(Continued)

FOREIGN PATENT DOCUMENTS

| | | |
|---|---|---|
| CN | 111248669 A | 6/2020 |
| CN | 112545196 A | 3/2021 |

(Continued)

*Primary Examiner* — Kimberley S Wright
(74) *Attorney, Agent, or Firm* — Rosenberg, Klein & Lee

(57) ABSTRACT

Provided is a furniture part assembly that includes a fitting and a panel. The panel is provided with a first engaging structure, and the fitting is provided with a second engaging structure configured to engage with the first engaging structure and thereby connect the fitting and the panel in a detachable manner. A piece of furniture having the furniture part assembly is also provided.

20 Claims, 18 Drawing Sheets

(56) References Cited

U.S. PATENT DOCUMENTS

| | | | | |
|---|---|---|---|---|
| 2014/0117828 A1* | 5/2014 | Gasser | ................ | A47B 88/941 |
| | | | | 312/334.7 |
| 2019/0343279 A1* | 11/2019 | Kampl | ................ | A47B 88/931 |
| 2020/0000226 A1* | 1/2020 | Kampl | ................ | A47B 88/423 |
| 2020/0297111 A1* | 9/2020 | Kampl | ................ | A47B 88/938 |

FOREIGN PATENT DOCUMENTS

| | | | | |
|---|---|---|---|---|
| DE | 202009002242 U1 | 8/2010 | | |
| JP | 2020509308 A | 3/2020 | | |
| JP | 2021506489 A | 2/2021 | | |
| TW | 201835458 A | 10/2018 | | |
| TW | 202017508 A | 5/2020 | | |
| WO | WO-2018166839 A1 * | 9/2018 | ........... | A47B 88/925 |
| WO | 2022006604 A1 | 1/2022 | | |

* cited by examiner

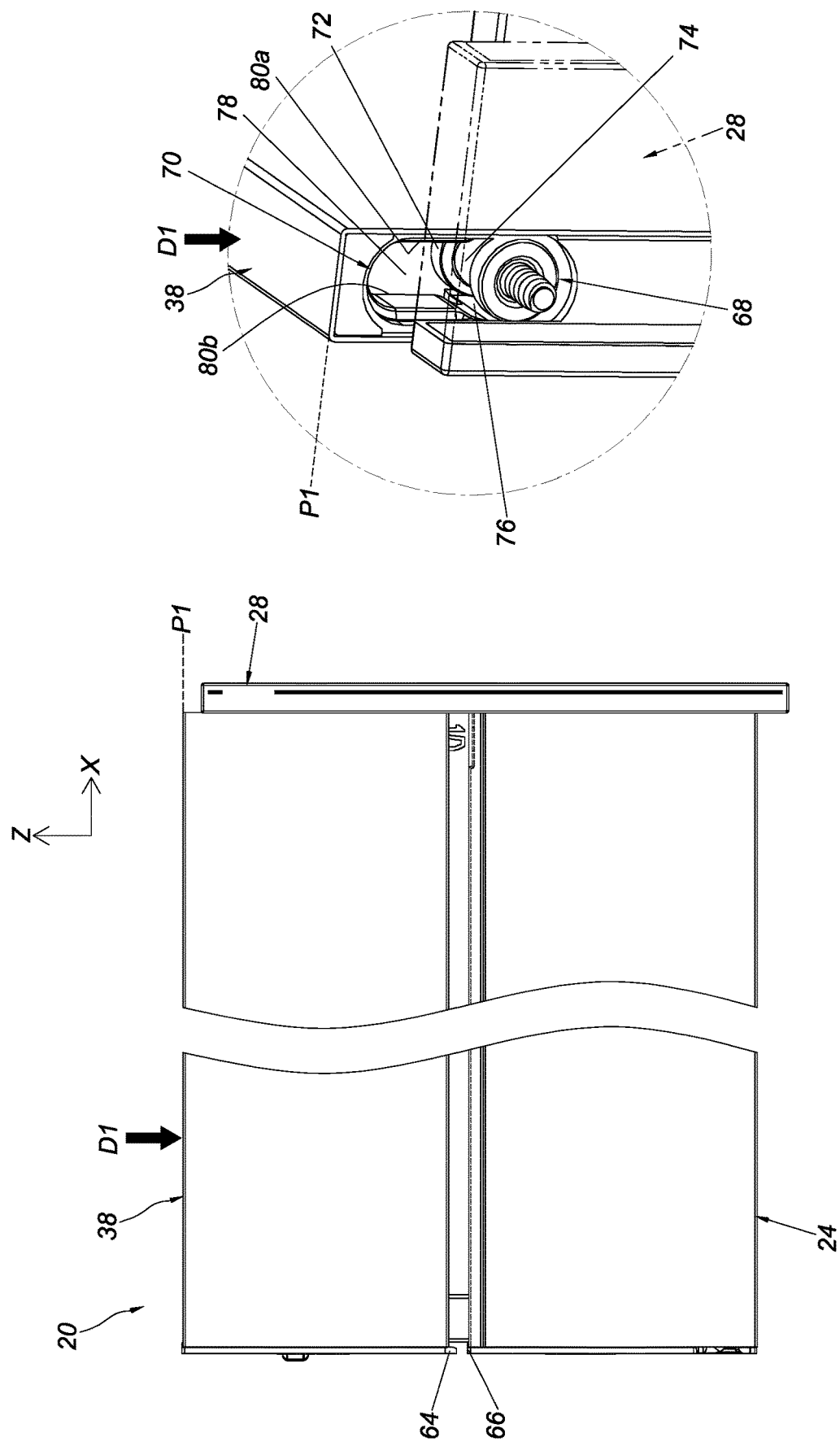

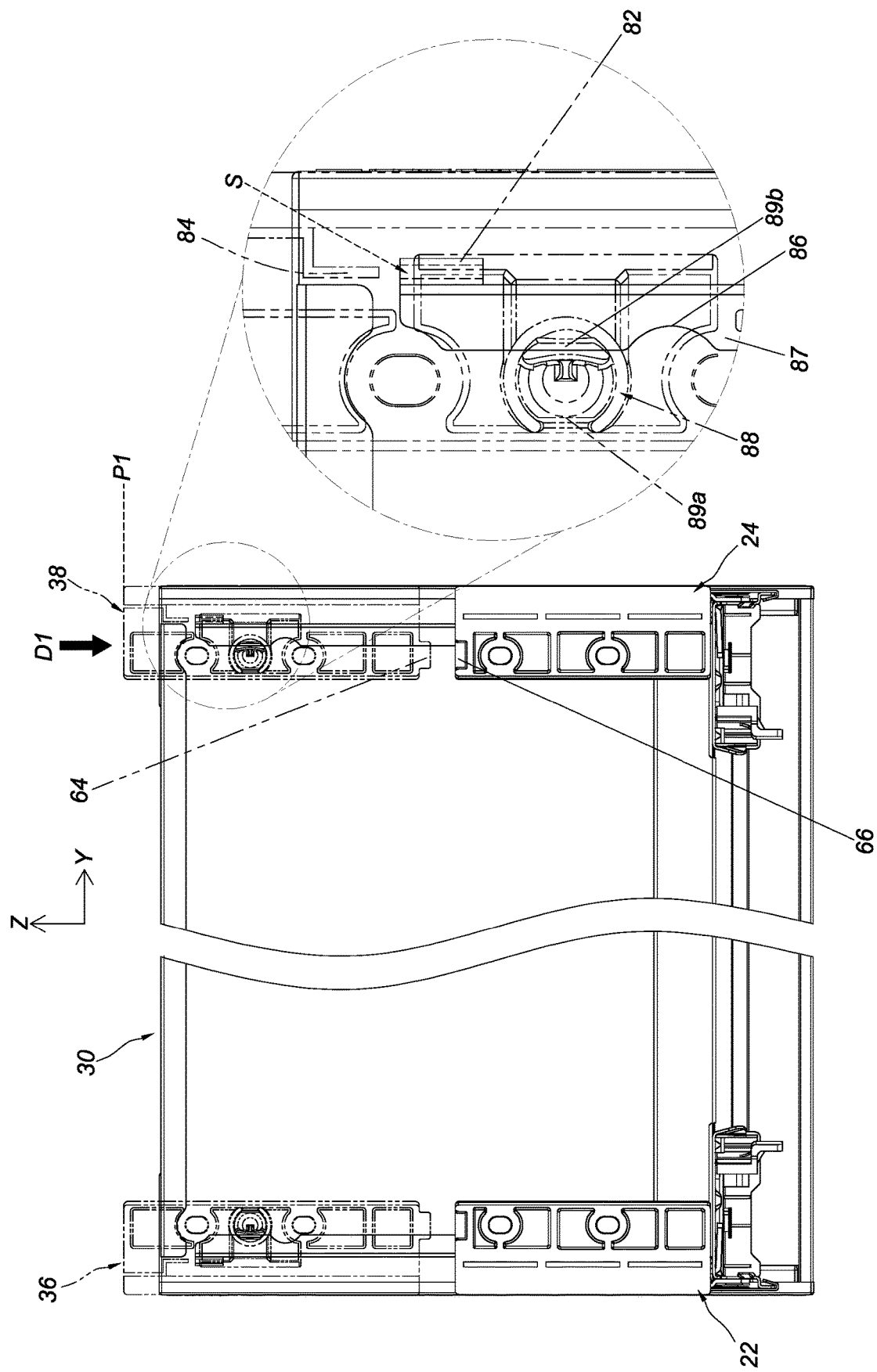

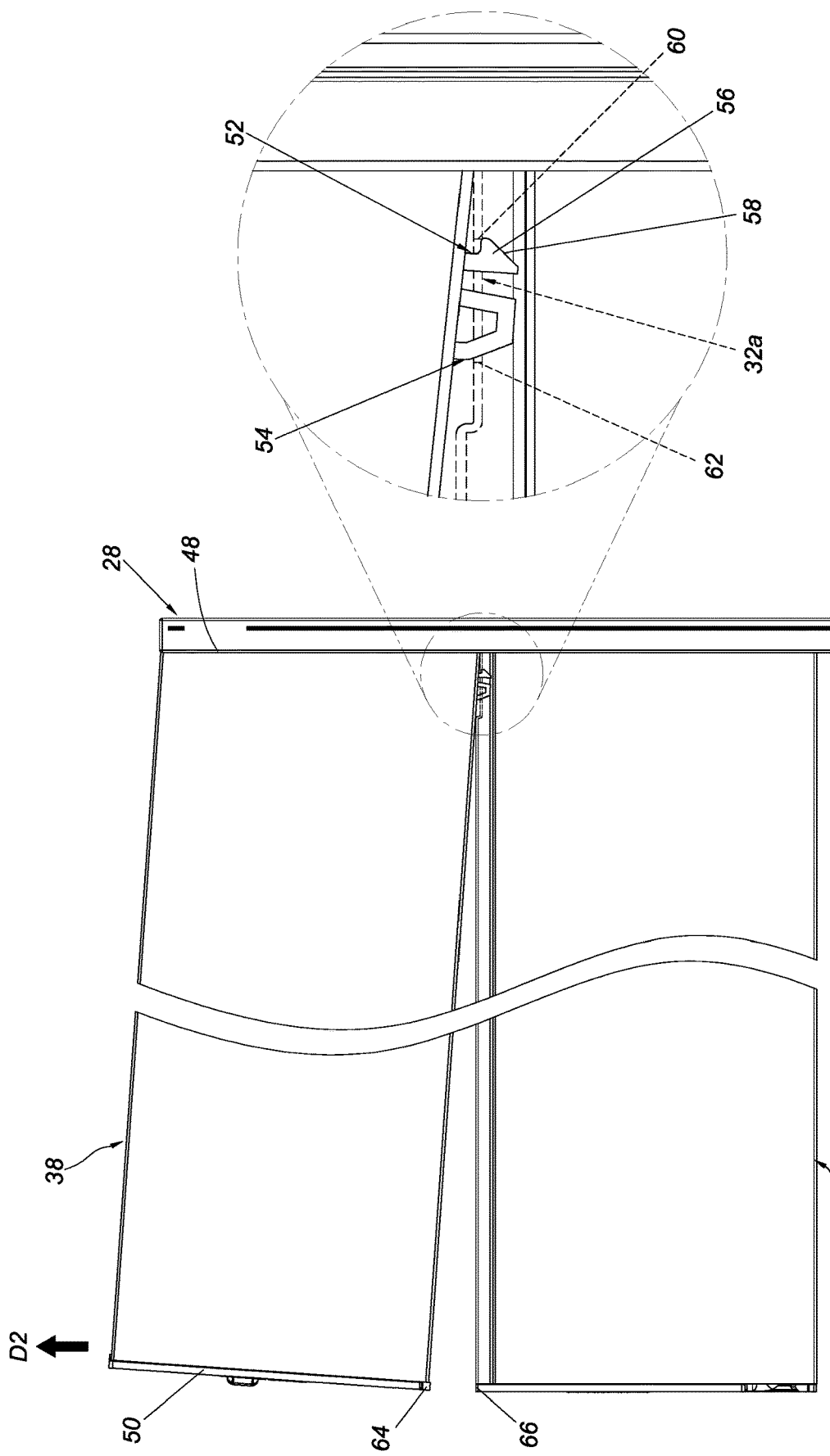

FURNITURE AND FURNITURE PART ASSEMBLY THEREOF

FIELD OF THE INVENTION

The present invention relates to furniture. More particularly, the invention relates to a piece of furniture on which at least one fitting can be mounted according to user needs, and a resulting furniture part assembly of the furniture.

BACKGROUND OF THE INVENTION

China Patent No. 111511251B discloses a railing strut. The two ends of the railing strut are provided with a locking element and an operation element respectively, and the two elements are configured to be mounted and locked to the corresponding wall elements respectively. To unlock the railing strut, it is required to apply a force to, and thereby move, the operation element, and the railing strut must be operated at both ends in order to terminate the locking relationship.

To satisfy different user needs, however, it is not always desired to put two furniture parts together in the way described above. It is therefore important to develop a product different from that disclosed in the afore-cited patent.

SUMMARY OF THE INVENTION

The present invention relates to a piece of furniture on which at least one fitting can be mounted according to user needs, and a resulting furniture part assembly of the furniture.

According to one aspect of the present invention, a furniture part assembly includes a fitting and a rear panel. The fitting has a front portion and a rear portion. The rear panel is provided with a first engaging structure, and a second engaging structure is provided adjacent to the rear portion of the fitting and is configured to engage with the first engaging structure and thereby connect the fitting and the rear panel in a detachable manner. One of the rear panel and the fitting is further provided with an engaging portion, and the other of the rear panel and the fitting is further provided with a release portion configured to connect with the engaging portion in a releasable manner.

According to another aspect of the present invention, a furniture part assembly includes a fitting, a front panel, and a rear panel. The front panel is provided with a first connecting feature. The fitting is provided with a second connecting feature for connecting with the first connecting feature. The rear panel is provided with a first engaging structure, and the fitting is provided with a second engaging structure configured to engage with the first engaging structure and thereby connect the fitting and the rear panel. The rear panel is further provided with an engaging portion, and the fitting is further provided with a release portion configured to connect with the engaging portion in a releasable manner.

According to still another aspect of the present invention, a piece of furniture includes a bottom panel, a first sidewall, a second sidewall, a front panel, a rear panel, and a fitting. The first sidewall and the second sidewall are located on a left side and a right side of the bottom panel respectively. The front panel and the rear panel are located on a front side and a rear side of the bottom panel respectively. The rear panel is provided with a first engaging structure, and the fitting is provided with a second engaging structure configured to engage with the first engaging structure and thereby connect the fitting and the rear panel in a detachable manner. The rear panel is further provided with an engaging portion, and the fitting is further provided with a release portion configured to connect with the engaging portion in a releasable manner.

BRIEF DESCRIPTION OF THE DRAWINGS

FIG. 5A is a partial rear view showing the first step of mounting the fittings on the sidewalls of the furniture respectively;

FIG. 7A is a partial rear view showing the third step of mounting the fittings on the sidewalls of the furniture respectively;

FIG. 9 is a side view showing the first step of mounting the fittings on the front panel of the furniture;

FIG. 9A is a partial front perspective view taken from another viewing angle, showing the first step of mounting the fittings on the front panel of the furniture;

FIG. 13 is a rear view showing the first step of mounting the fittings on the rear panel of the furniture;

FIG. 17 shows how the fittings are detached from the sidewalls of the furniture respectively.

DETAILED DESCRIPTION OF THE INVENTION

Figure 1:
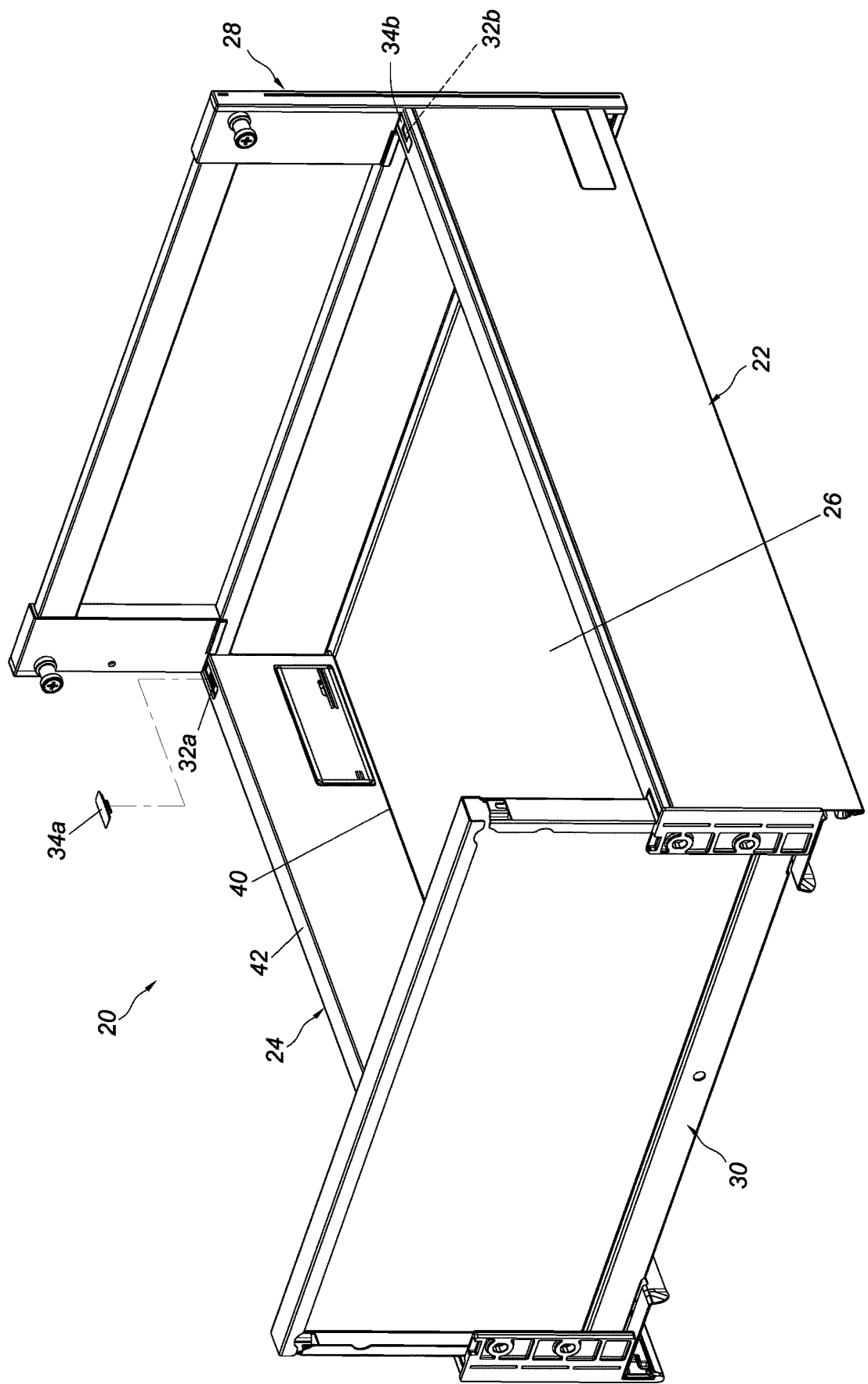
FIG. 1 is a perspective view of the furniture according to an embodiment of the present invention.

Referring to FIG. 1, the furniture 20 according to an embodiment of the present invention is, for example but not limited to, a drawer. The furniture 20 includes a first sidewall 22, a second sidewall 24, a bottom panel 26, a front panel 28, and a rear panel 30.

The first sidewall 22 and the second sidewall 24 are located, for example, on the left and right sides of the bottom panel 26 respectively. The term "left and right sides" is used only to facilitate understanding of the relative positions of the sidewalls. That is to say, the left and right sides are interchangeable and are not intended to limit the actual positions of the sidewalls. The front panel 28 and the rear panel 30 are located, for example, on the front and rear sides of the bottom panel 26 respectively.

The first sidewall 22, the second sidewall 24, the bottom panel 26, the front panel 28, and the rear panel 30 jointly define a receiving space for receiving an object.

The first sidewall 22 and the second sidewall 24 have substantially the same structural configuration (the first sidewall 22 or the second sidewall 24 is also referred to herein as the sidewall for short). The second sidewall 24 is provided with a mounting feature 32a (which is, for example but not limited to, an aperture), and a covering member 34a is detachably mounted on the mounting feature 32a. The second sidewall 24 is configured to be mounted with a fitting by way of the mounting feature 32a after the covering member 34a is detached from the mounting feature 32a. Similarly, the first sidewall 22 is provided with another mounting feature 32b (which is, for example but not limited to, an aperture), and another covering member 34b is detachably mounted on the mounting feature 32b. The first sidewall 22 is configured to be mounted with another fitting by way of the mounting feature 32b after the covering member 34b is detached from the mounting feature 32b. It should be pointed out that in FIG. 1 the covering member 34b of the first sidewall 22 has yet to be detached from the mounting feature 32b, and that if the covering member 34a of the second sidewall 24 in FIG. 1 were not detached from the mounting feature 32a, the covering member 34a would cover the mounting feature 32a (in the same way as the covering member 34b of the first sidewall 22 covers the mounting feature 32b, as shown in FIG. 1) and produce a dustproof effect.

Figure 2:
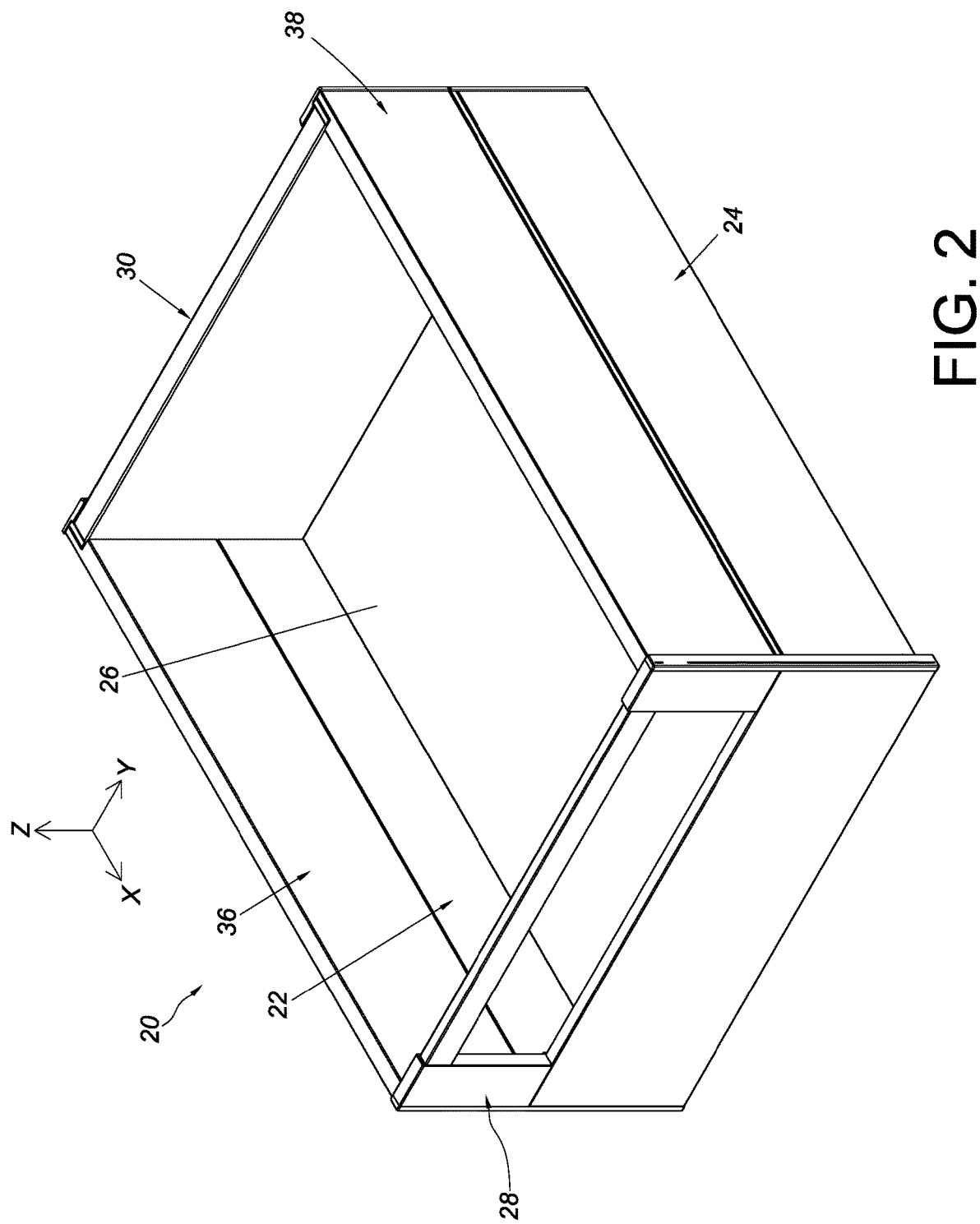
FIG. 2 is a perspective view showing that fittings can be used to add to the height of the furniture.

Referring to FIG. 2, the furniture 20 has a length direction X, a width direction Y, and a height direction Z. The length direction X, the width direction Y, and the height direction Z are perpendicular to one another. After the two covering members 34a and 34b are detached from the second sidewall 24 and the first sidewall 22 respectively, the first sidewall 22 and the second sidewall 24 can be mounted with a first fitting 36 and a second fitting 38 respectively, e.g., with the first fitting 36 and the second fitting 38 stacked on the first sidewall 22 and the second sidewall 24 respectively. Hence, depending on user needs, the first fitting 36 and the second fitting 38 can add to or increase the height of the two sidewalls 22 and 24 of the furniture 20, and it is feasible to make the increased height match the height of the front panel 28 and the rear panel 30. The second fitting 38 (also referred to herein as the fitting for short), the rear panel 30, and preferably also the front panel 28 constitute a furniture part assembly. Similarly, the first fitting 36 (also referred to herein as the fitting for short), the rear panel 30, and preferably also the front panel 28 constitute another furniture part assembly.

Figure 3:
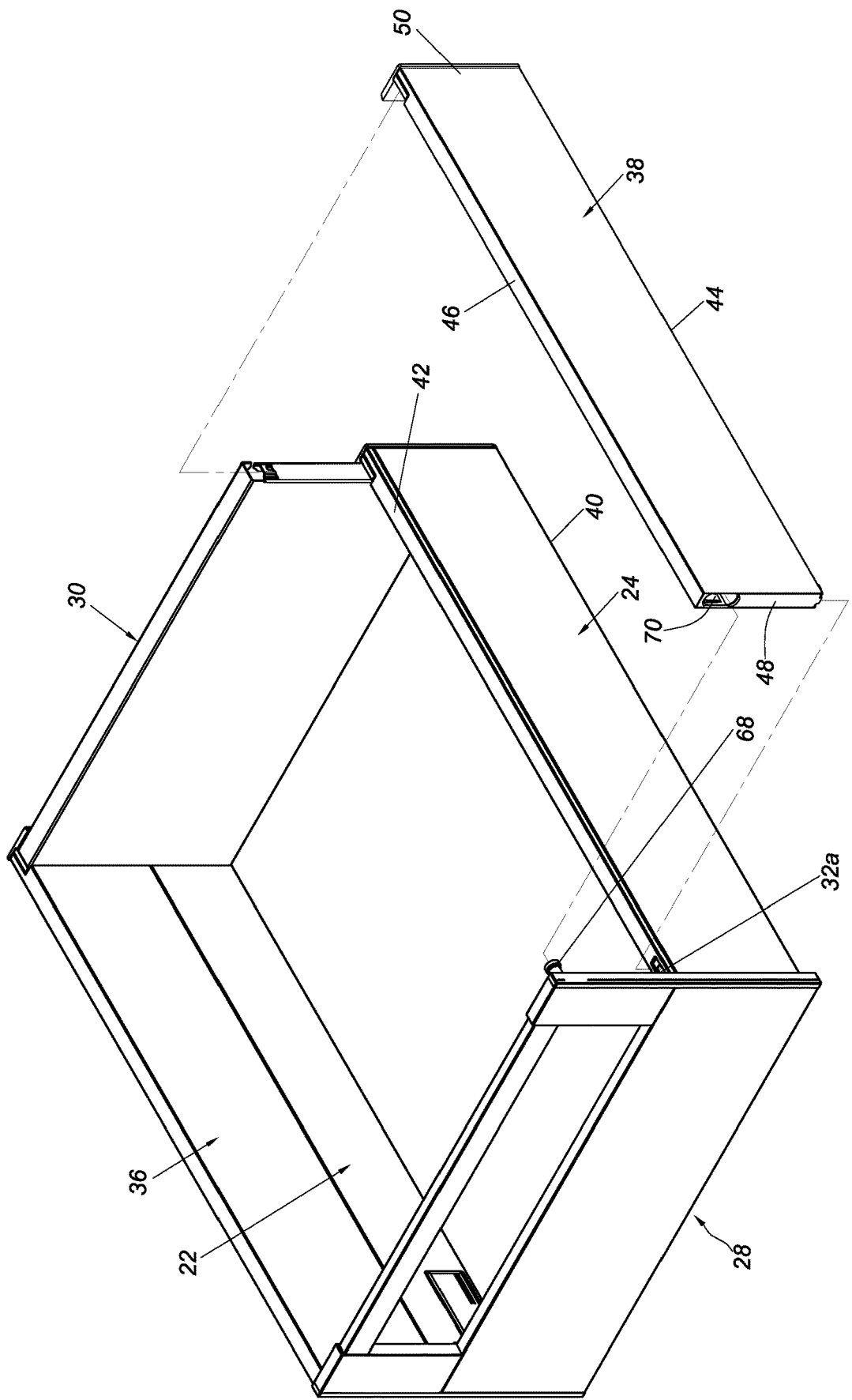
FIG. 3 is a partially exploded view that shows the furniture and the fittings from a first viewing angle.
Figure 4:
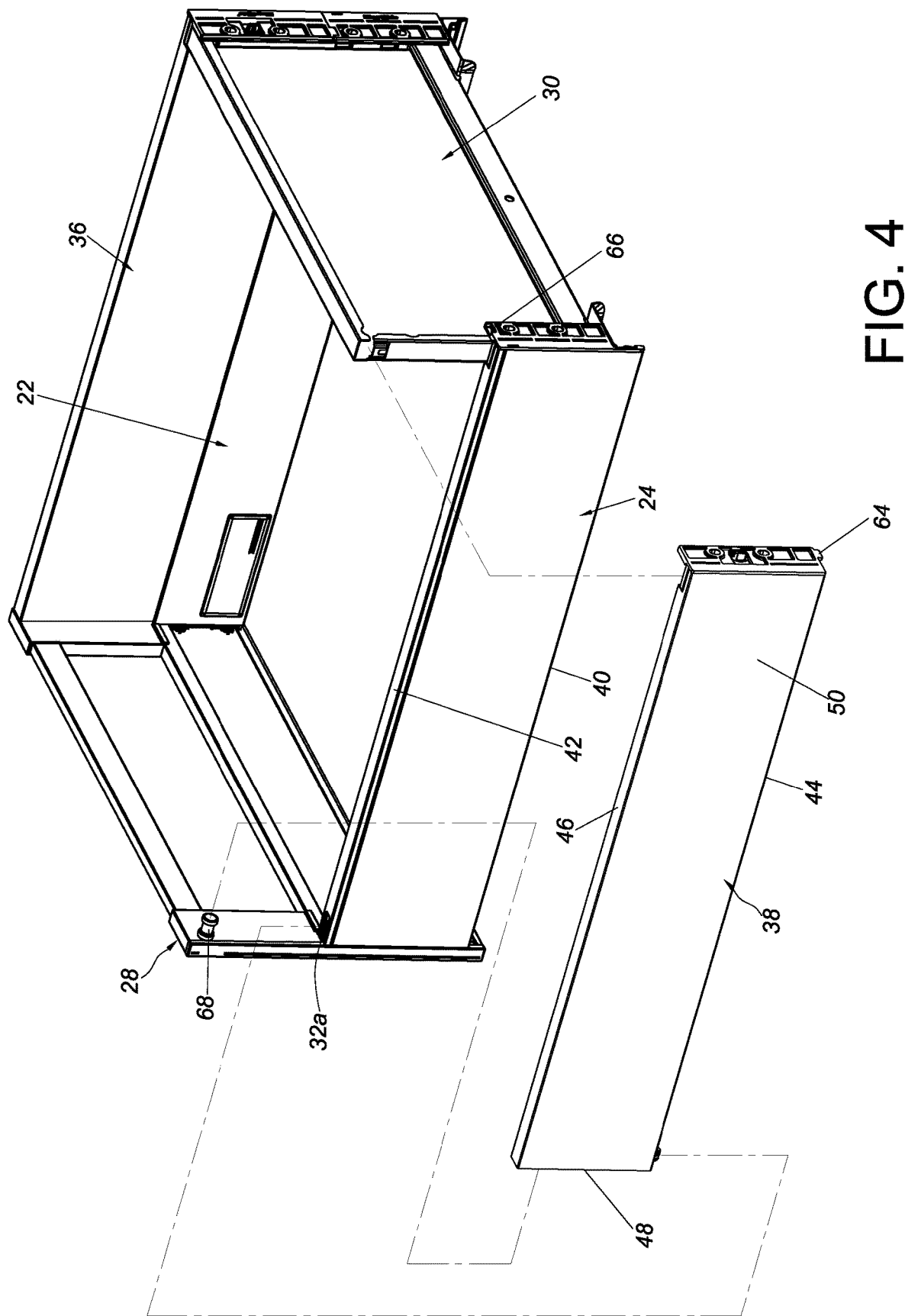
FIG. 4 is a partially exploded view that shows the furniture and the fittings from a second viewing angle.

As shown in FIG. 3 and FIG. 4, the second fitting 38 has a front portion 48 and a rear portion 50. The rear portion 50 of the second fitting 38 is configured to connect with the rear panel 30.

Preferably, one of the first sidewall 22 and the second sidewall 24 (e.g., the second sidewall 24) includes a bottom portion 40 and a top portion 42. The top portion 42 is provided with the mounting feature 32a, and the covering member 34a has been detached from the mounting feature 32a of the second sidewall 24 so that the second fitting 38 can be mounted on the second sidewall 24. More specifically, the second fitting 38 includes a bottom portion 44 and a top portion 46, and the bottom portion 44 of the second fitting 38 is configured to be mounted to the mounting feature 32a of the second sidewall 24. In addition, the front portion 48 of the second fitting 38 is configured to connect with the front panel 28.

Figure 5:
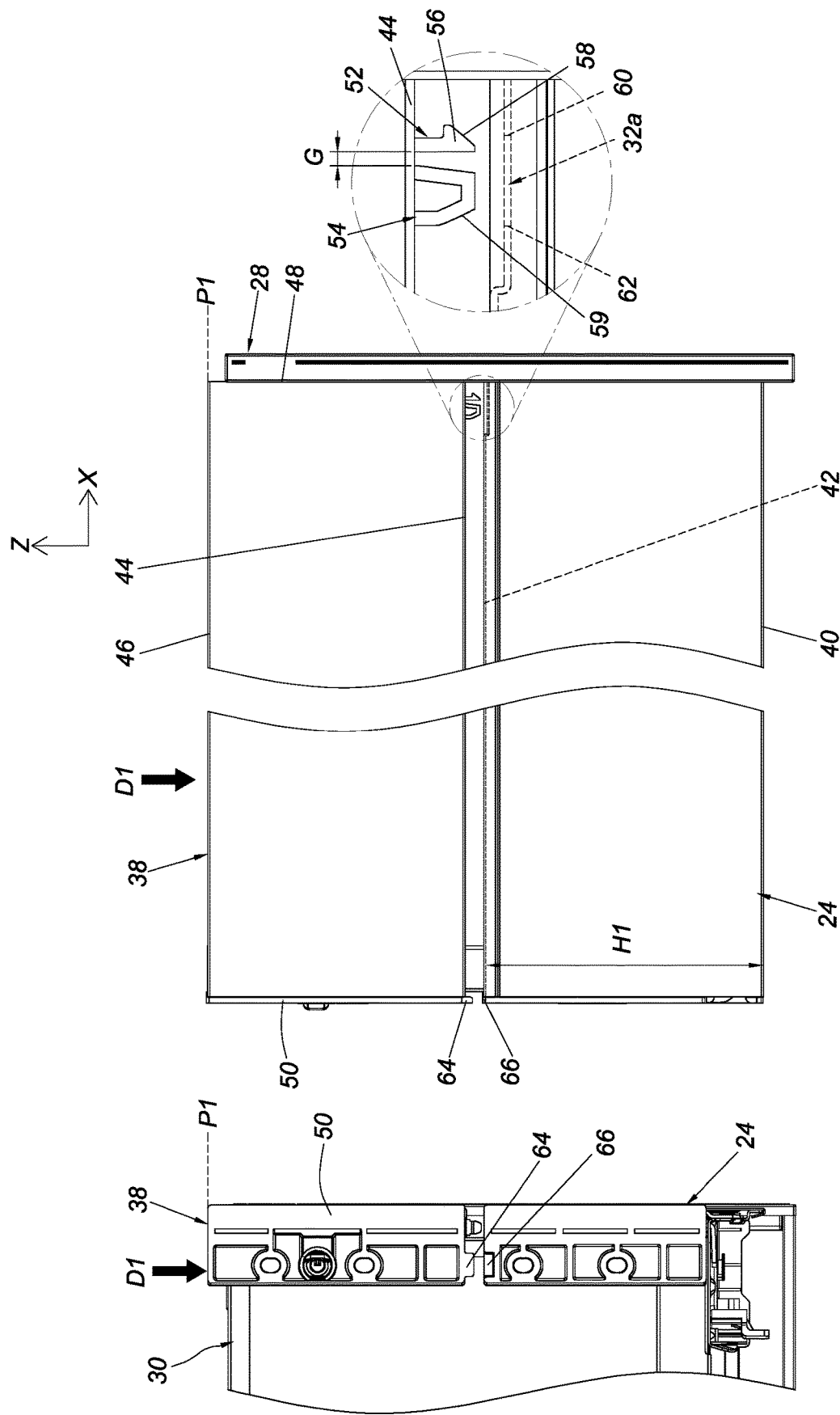
FIG. 5 is a side view showing the first step of mounting the fittings on the sidewalls of the furniture respectively.
Figure 6:
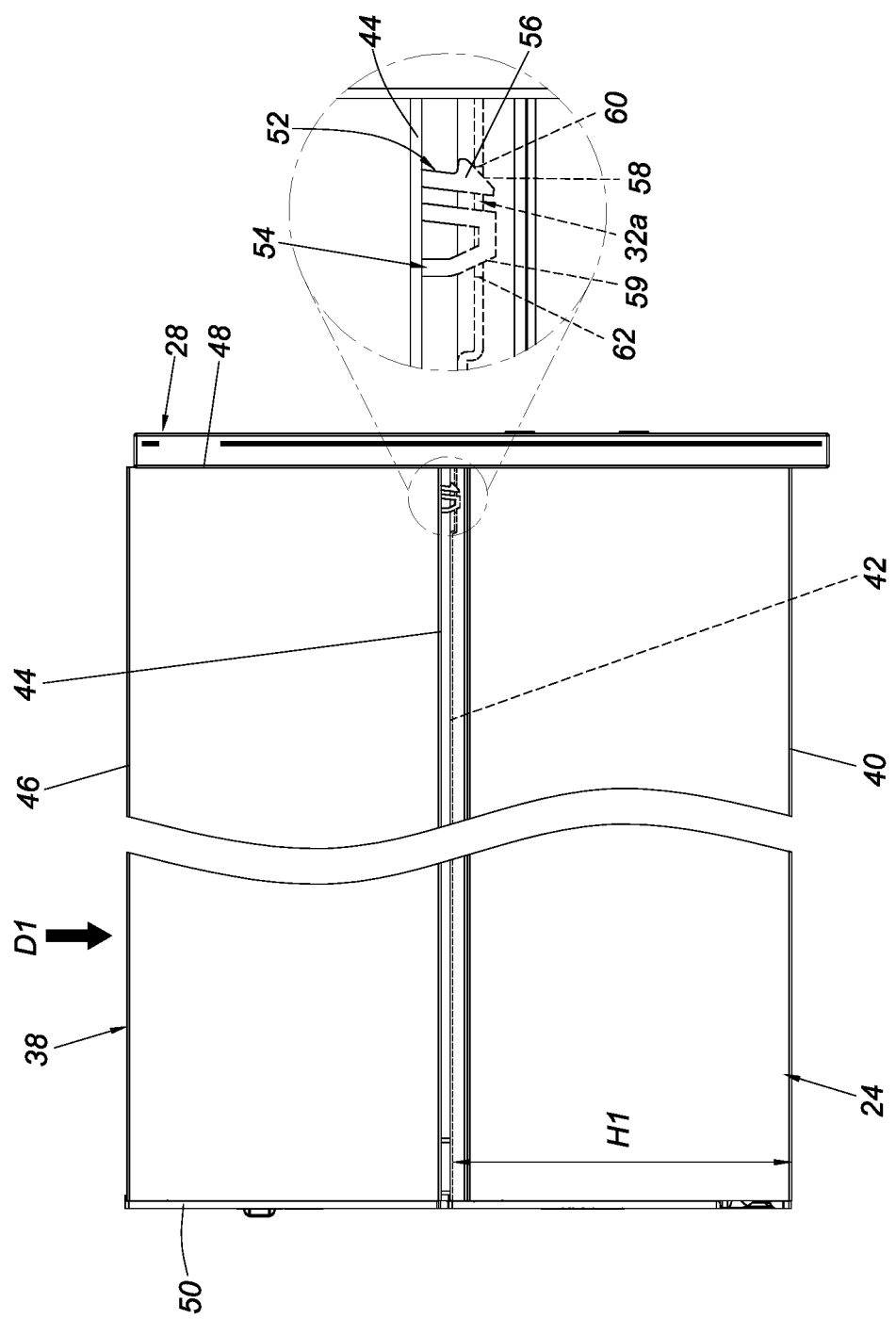
FIG. 6 is a side view showing the second step of mounting the fittings on the sidewalls of the furniture respectively.
Figure 7:
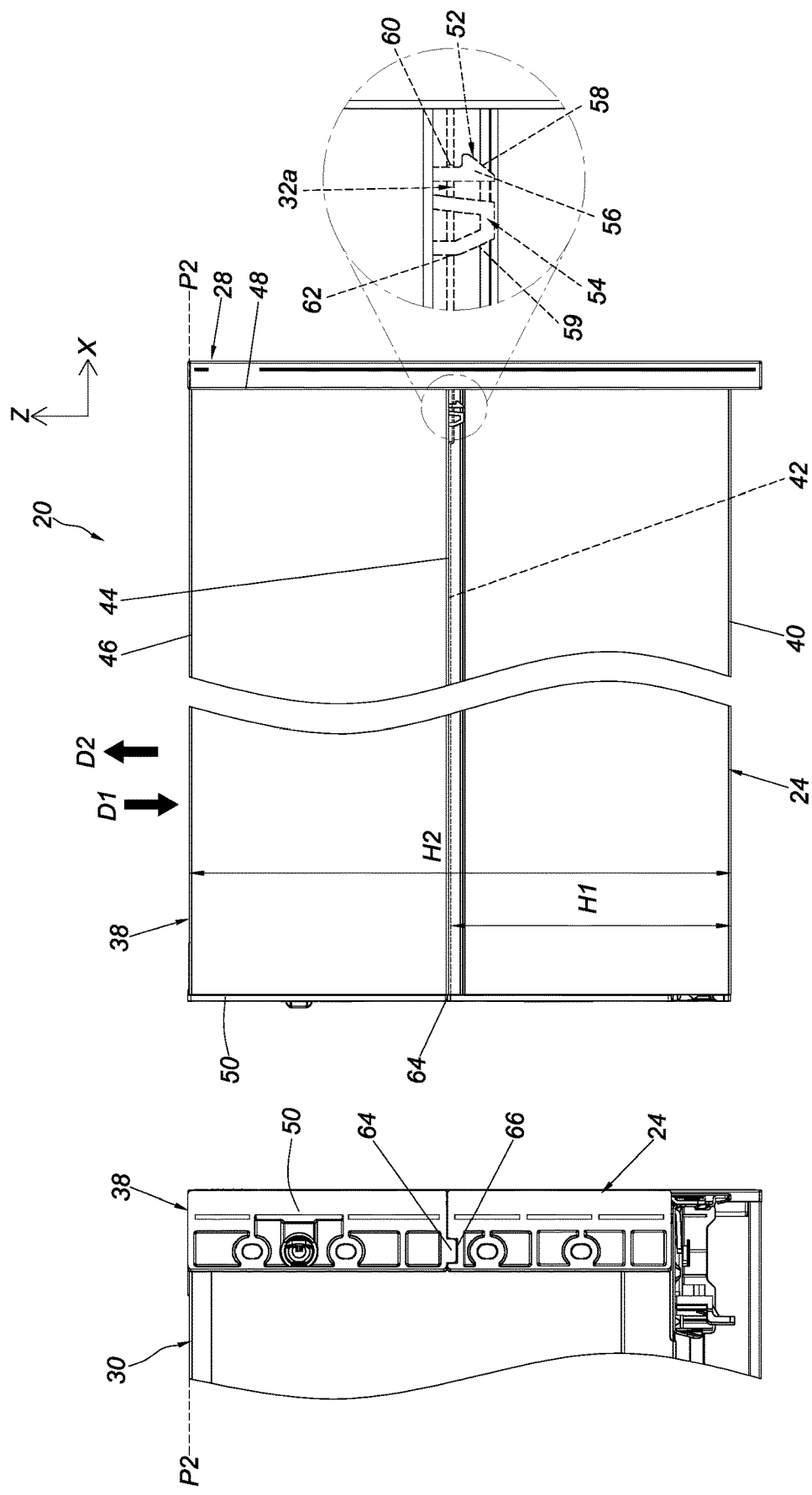
FIG. 7 is a side view showing the third step of mounting the fittings on the sidewalls of the furniture respectively.

Referring to FIG. 5, FIG. 6, and FIG. 7, the top portion 42 of the second sidewall 24 has a first predetermined height H1 with respect to the bottom portion 40. Once the covering member 34a is detached from the mounting feature 32a of the second sidewall 24, the bottom portion 44 of the second fitting 38 can be mounted (e.g., detachably mounted) to the mounting feature 32a of the second sidewall 24 such that the second fitting 38 is located on the second sidewall 24, e.g., with the second fitting 38 stacked on the second sidewall 24 (see FIG. 7), and with the top portion 46 of the second fitting 38 having a second predetermined height H2 with respect to the bottom portion 40 of the second sidewall 24, wherein the second predetermined height H2 is greater than the first predetermined height H1 (see FIG. 7).

Preferably, the second fitting 38 is provided with at least one mounting portion, such as a first mounting portion 52 and a second mounting portion 54, both arranged on the bottom portion 44 of the second fitting 38.

Preferably, the first mounting portion 52 (also referred to herein as the mounting portion for short) has an engaging hook 56, and the engaging hook 56 has a guiding feature 58, wherein the guiding feature 58 is, for example but not limited to, an inclined surface or a curved surface. Similarly, the second mounting portion 54 has a guiding section 59, and the guiding section 59 is, for example but not limited to, an inclined surface or a curved surface.

Preferably, the first mounting portion 52 and the second mounting portion 54 are made of a flexible material such as but not limited to plastic.

Preferably, there is a gap G between the first mounting portion 52 and the second mounting portion 54 (see FIG. 5).

Preferably, the first mounting portion 52 and the second mounting portion 54 are located adjacent to the front portion 48 of the second fitting 38.

The second fitting 38 is configured to be mounted on the second sidewall 24 in a first predetermined direction D1 from a first predetermined position P1 (see FIG. 5). During the mounting process, the first mounting portion 52 and the second mounting portion 54 on the bottom portion 44 of the second fitting 38 are aligned with the mounting feature 32a of the second sidewall 24. Once the guiding feature 58 of the first mounting portion 52 contacts a first inner wall 60 of the mounting feature 32a (the guiding section 59 of the second mounting portion 54 being configured to contact a second inner wall 62 of the mounting feature 32a) as shown in FIG. 6, the engaging hook 56 is easily guided into the mounting feature 32a (e.g., an aperture) of the second sidewall 24, and thanks to the gap G, the engaging hook 56 is turned by an angle and thus brought closer to the second mounting portion 54. The first mounting portion 52 in this state stores an elastic force (see FIG. 6).

When the second fitting 38 reaches a second predetermined position P2 (see FIG. 7) after being moved further in the first predetermined direction D1, the first mounting portion 52 is moved away from the second mounting portion 54 in response to the release of the stored elastic force. Consequently, the first mounting portion 52 and the second mounting portion 54 are mounted on the first inner wall 60 and the second inner wall 62 of the mounting feature 32a of the second sidewall 24 respectively, thereby connecting the second fitting 38 and the second sidewall 24 in a detachable manner (see FIG. 7). It can be known from the above that, when not yet detached from the mounting feature 32a of the second sidewall 24, the second fitting 38 is mounted to the mounting feature 32a (e.g., an aperture) via the mounting portion (e.g., the first mounting portion 52).

Preferably, the engaging hook 56 of the first mounting portion 52 is configured to be hooked to the first inner wall 60 of the mounting feature 32a so as to prevent the second fitting 38 from separating from the second sidewall 24 in a second predetermined direction D2, which is the opposite direction of the first predetermined direction D1 (see FIG. 7). For example, the engaging hook 56 can prevent the second fitting 38 and the second sidewall 24 from separating from each other in the height direction Z of the furniture 20.

Preferably, the second mounting portion 54 is configured to press against the second inner wall 62 to ensure a tight fit (see FIG. 7).

As shown in FIG. 5A and FIG. 7A, a first supporting feature 64 is provided adjacent to the rear portion 50 of the second fitting 38, and the second sidewall 24 is provided with a second supporting feature 66 (see FIG. 5A and FIG. 5). When the second fitting 38 reaches the second predetermined position P2 (see FIG. 7A and FIG. 7) after being moved from the first predetermined position P1 (see FIG. 5A and FIG. 5) in the first predetermined direction D1, the second supporting feature 66 and the first supporting feature 64 are supported by each other to produce a positioning effect. One of the first supporting feature 64 and the second supporting feature 66 is a projection, and the other of the first supporting feature 64 and the second supporting feature 66 is a recess; in practice, however, the present invention has no limitation on the configurations of the two supporting features.

Figure 8:
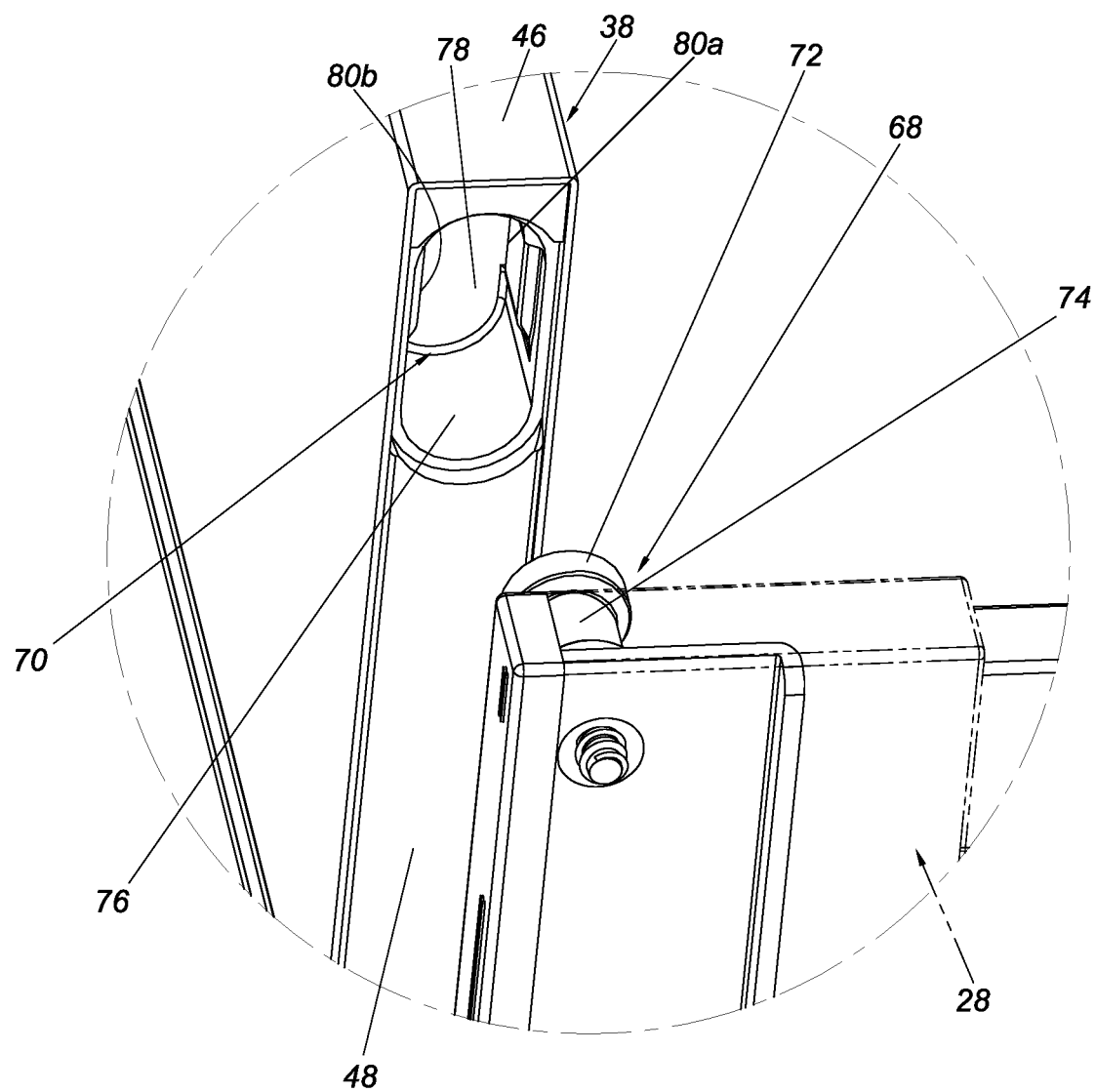
FIG. 8 is a partial exploded view that shows the front panel of the furniture and one of the fittings from a certain viewing angle.
Figures 10, 10A:
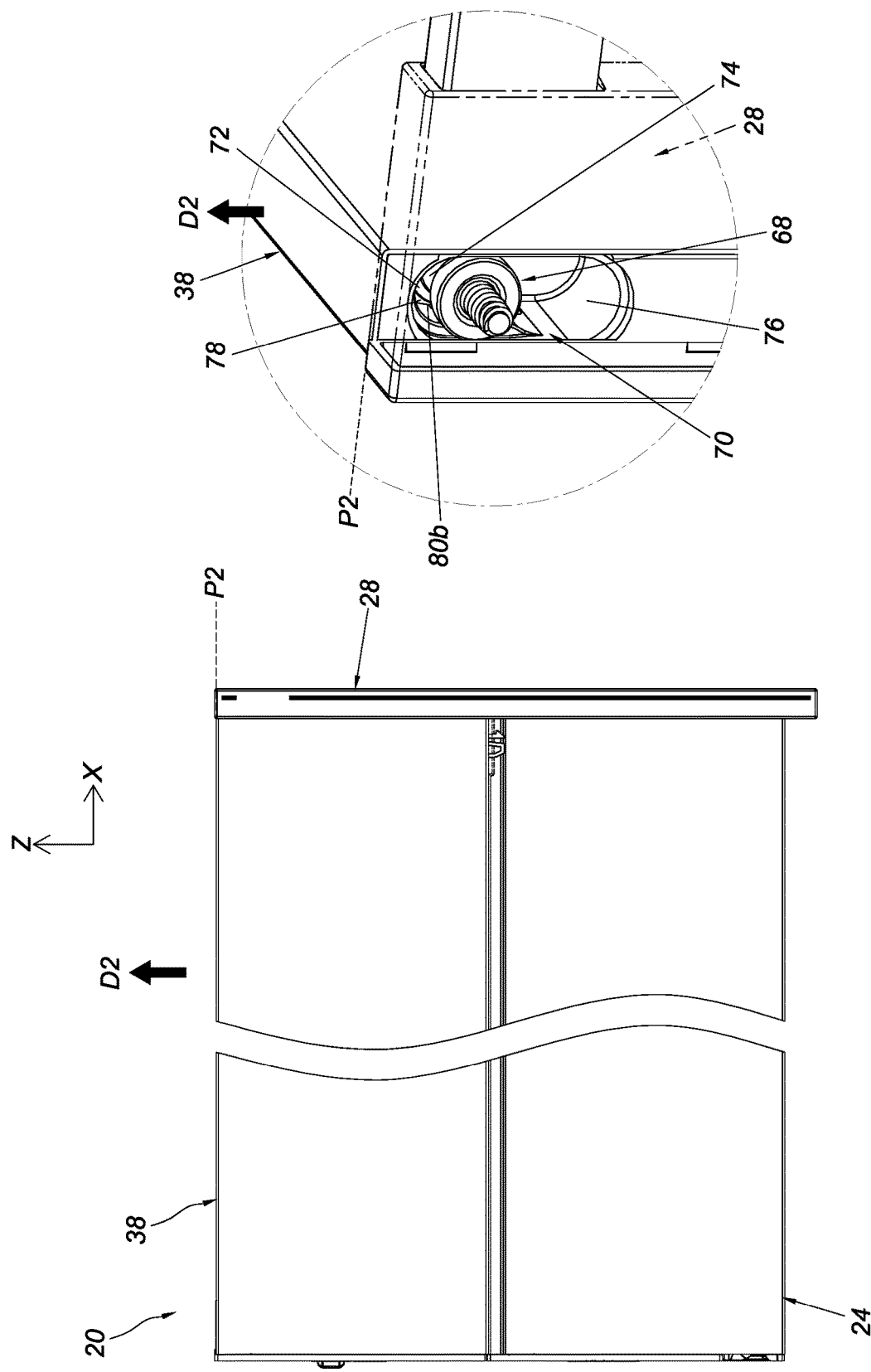
FIG. 10 is a side view showing the second step of mounting the fittings on the front panel of the furniture.
FIG. 10A is a partial front perspective view taken from another angle, showing the second step of mounting the fittings on the front panel of the furniture.

Referring to FIG. 8, the front portion 48 of the second fitting 38 is configured to connect with the front panel 28. Preferably, one of the front panel 28 and the front portion 48 of the second fitting 38 is provided with a first connecting feature 68, and the other of the front panel 28 and the front portion 48 of the second fitting 38 is provided with a second connecting feature 70 configured to connect with the first connecting feature 68. For example, the first connecting feature 68 includes a head portion 72 and an extension portion 74, the extension portion 74 is connected to the front panel 28 at one end and is connected to the head portion 72 at the other end, the head portion 72 is larger in size than the extension portion 74, and the second connecting feature 70 includes an entrance opening 76 and a receiving room 78 in communication with the entrance opening 76. The head portion 72 is configured to enter the receiving room 78 through the entrance opening 76, engage with at least one predetermined wall (e.g., a first predetermined wall 80a and/or a second predetermined wall 80b) in the receiving room 78, and thereby connect the second fitting 38 and the front panel 28 in a detachable manner.

Referring to FIG. 9, FIG. 9A, FIG. 10, and FIG. 10A, when the second fitting 38 is at the first predetermined position P1, the head portion 72 of the first connecting feature 68 of the front panel 28 enters the entrance opening 76 of the second connecting feature 70 of the second fitting 38 (see FIG. 9 and FIG. 9A). When the second fitting 38 reaches the second predetermined position P2 after being moved with respect to the front panel 28 from the first predetermined position P1 in the first predetermined direction D1, the head portion 72 of the first connecting feature 68 of the front panel 28 enters the receiving room 78 of the second connecting feature 70 of the second fitting 38 and engages with the at least one predetermined wall (e.g., the first predetermined wall 80a and/or the second predetermined wall 80b) in the receiving room 78 to achieve detachable connection between the second fitting 38 and the front panel 28 (see FIG. 10 and FIG. 10A). The engagement between the head portion 72 and the at least one predetermined wall (e.g., the first predetermined wall 80a and/or the second predetermined wall 80b) in the receiving room 78 can, for example, prevent the second fitting 38 and the front panel 28 from separating from each other in the length direction X of the furniture 20.

Figure 11:
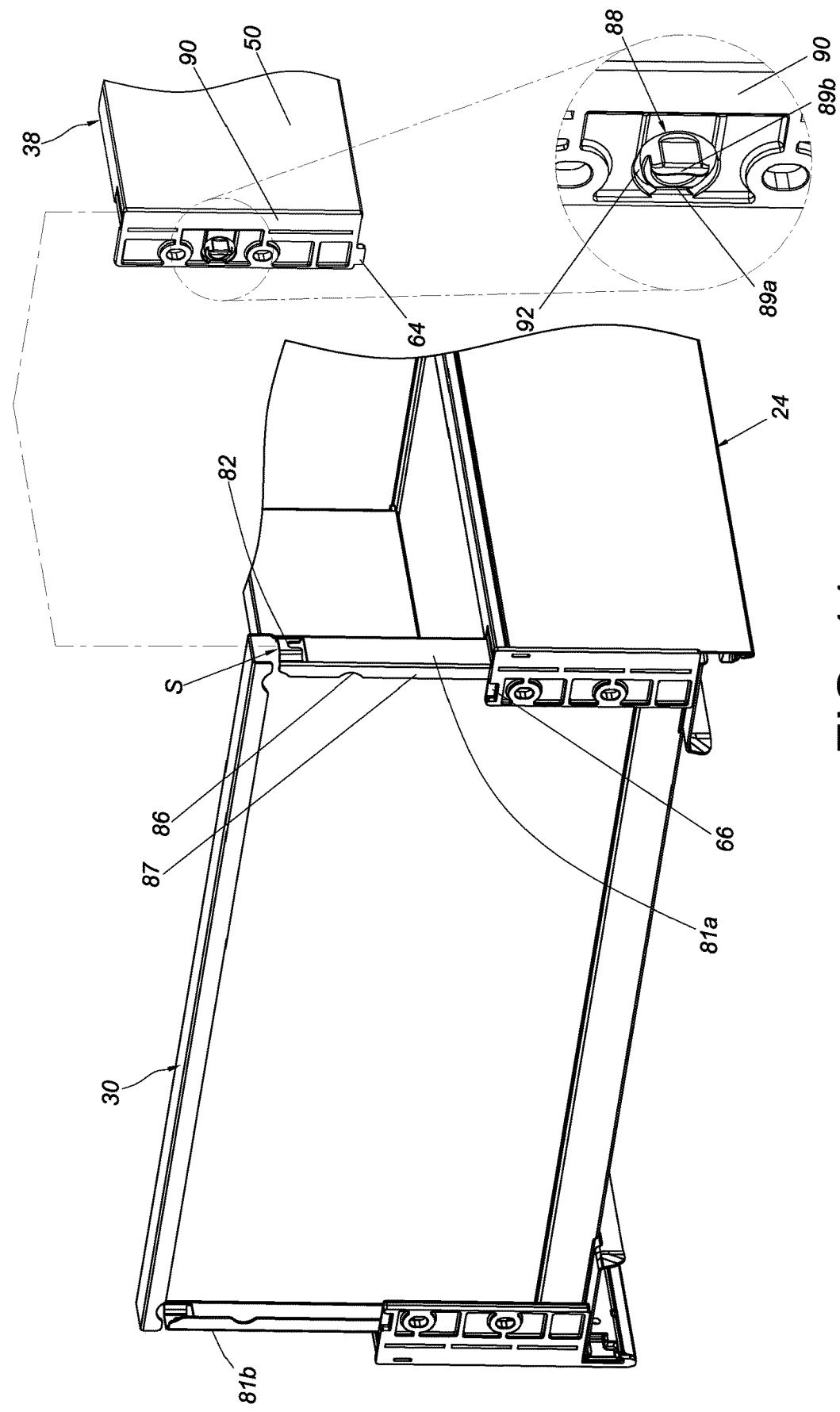
FIG. 11 is a partial exploded view that shows the rear panel of the furniture and one of the fittings from a first viewing angle.
Figure 12:
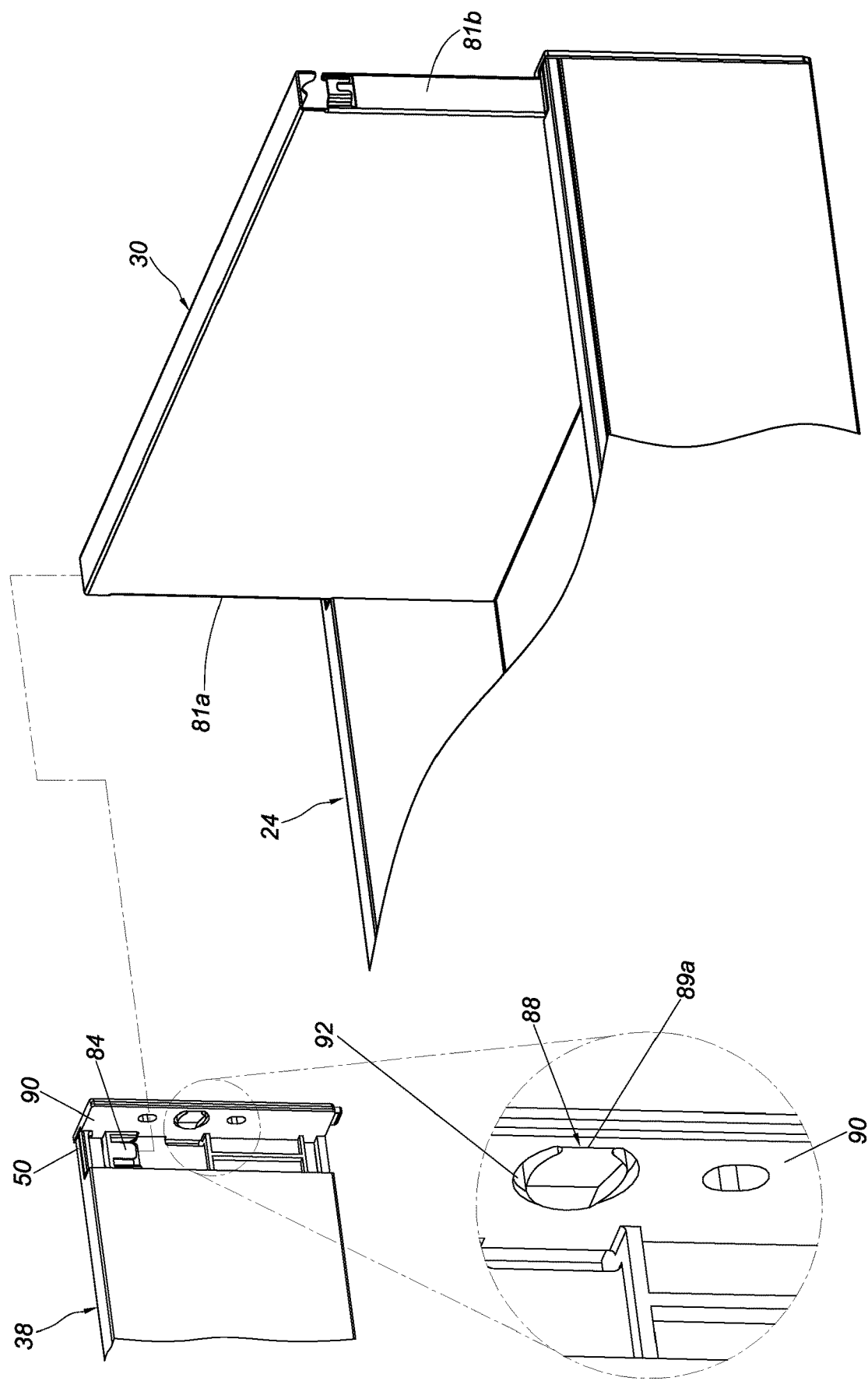
FIG. 12 is a partial exploded view that shows the rear panel of the furniture and the fitting in FIG. 11 from a second viewing angle.
Figure 13A:
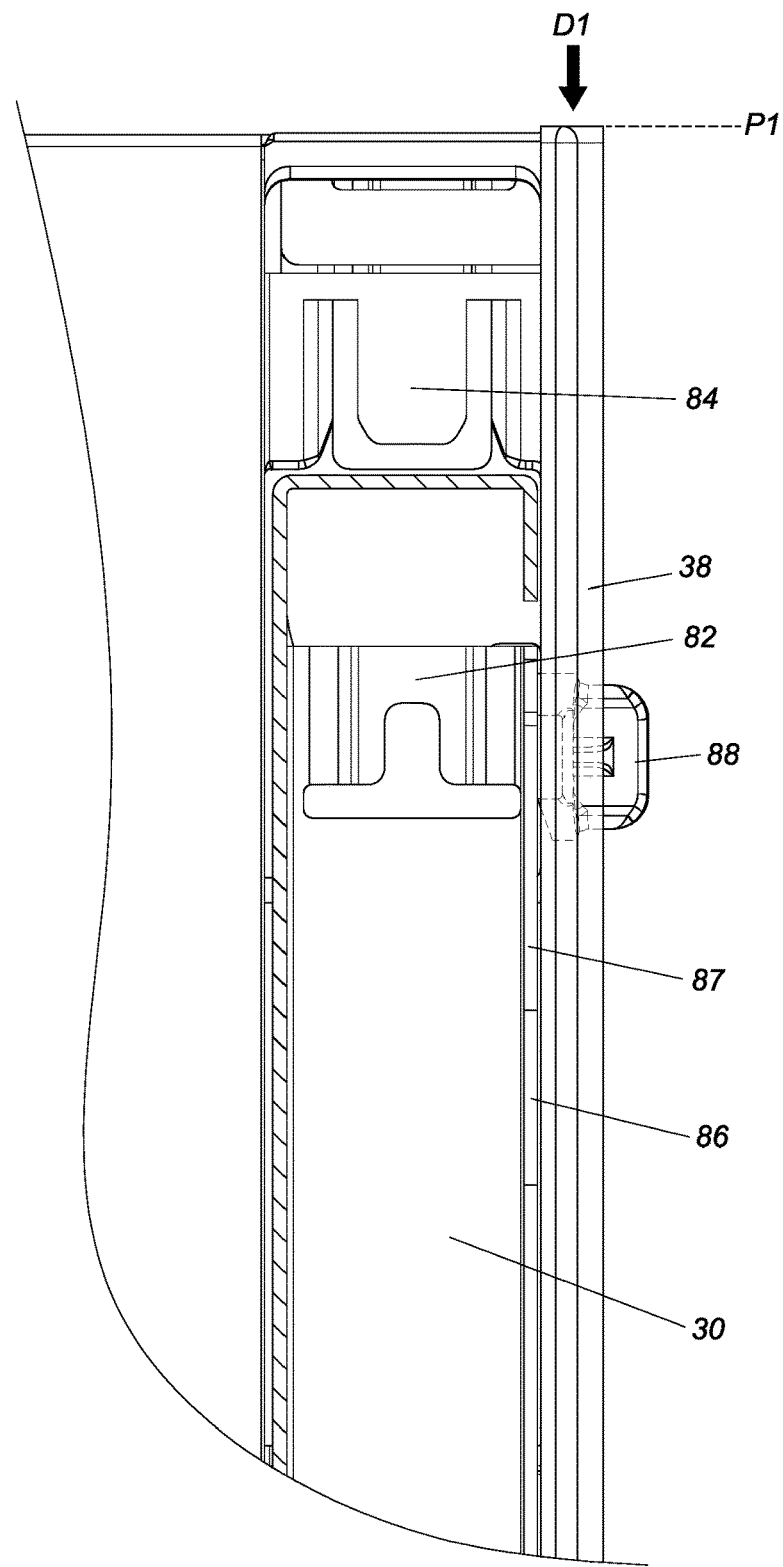
FIG. 13A is a partial side view showing the first step of mounting the fittings on the rear panel of the furniture.

Referring to FIG. 11 and FIG. 12, the rear portion 50 of the second fitting 38 is configured to connect with the rear panel 30. Preferably, the rear panel 30 has two opposite lateral sides 81a and 81b, and each of the two lateral sides 81a and 81b is provided with a first engaging structure 82 (only the lateral side 81a is described below by way of example) (see FIG. 11). Preferably, a second engaging structure 84 (see FIG. 12) is provided adjacent to the rear portion 50 of the second fitting 38 and is configured to detachably engage with the first engaging structure 82 of the lateral side 81a and thereby connect the second fitting 38 and the rear panel 30 in a detachable manner.

Preferably, one of the first engaging structure 82 and the second engaging structure 84 is a projection that defines a mounting space S (see FIG. 11), and the other of the first engaging structure 82 and the second engaging structure 84 is an extension member configured to be mounted (e.g., inserted) in the mounting space S such that the extension member and the projection are supported by or abut against each other. Here, by way of example, the first engaging structure 82 is a projection and defines the mounting space S, and the second engaging structure 84 is the extension member.

Preferably, one of the rear panel 30 and the second fitting 38 is provided with an engaging portion 86 (see FIG. 11), and the other of the rear panel 30 and the second fitting 38 is provided with a release portion 88 (see FIG. 11 and FIG. 12) configured to connect with the engaging portion 86 in a releasable manner. Here, by way of example, the rear panel 30 is provided with the engaging portion 86, and the second fitting 38 is provided with the release portion 88. The rear panel 30 further includes a bent section 87 that is bent with respect to the lateral side 81a. For example, the bent section 87 is perpendicularly connected to the lateral side 81a, and the engaging portion 86 is located at the bent section 87.

Preferably, the engaging portion 86 is, for example, a stop wall, and the stop wall has, for example but not limited to, a generally C-shaped or curved contour. Preferably, the rear portion 50 of the second fitting 38 is provided with an auxiliary connecting member 90, the auxiliary connecting member 90 is bent with respect to the rear portion 50 of the second fitting 38 or is perpendicularly connected to the rear portion 50 of the second fitting 38, and the release portion 88 is, for example but not limited to, an elastic portion provided on the auxiliary connecting member 90.

Preferably, the release portion 88 includes an elastic section 89a connected to the auxiliary connecting member 90 and an operation section 89b located on the elastic section 89a. The operation section 89b is, for example, a projection or a protruding block. The auxiliary connecting member 90 has an engaging space 92 extending along the periphery of the release portion 88 and matching the generally C-shaped or curved contour of the engaging portion 86 (stop wall).

Figure 14:
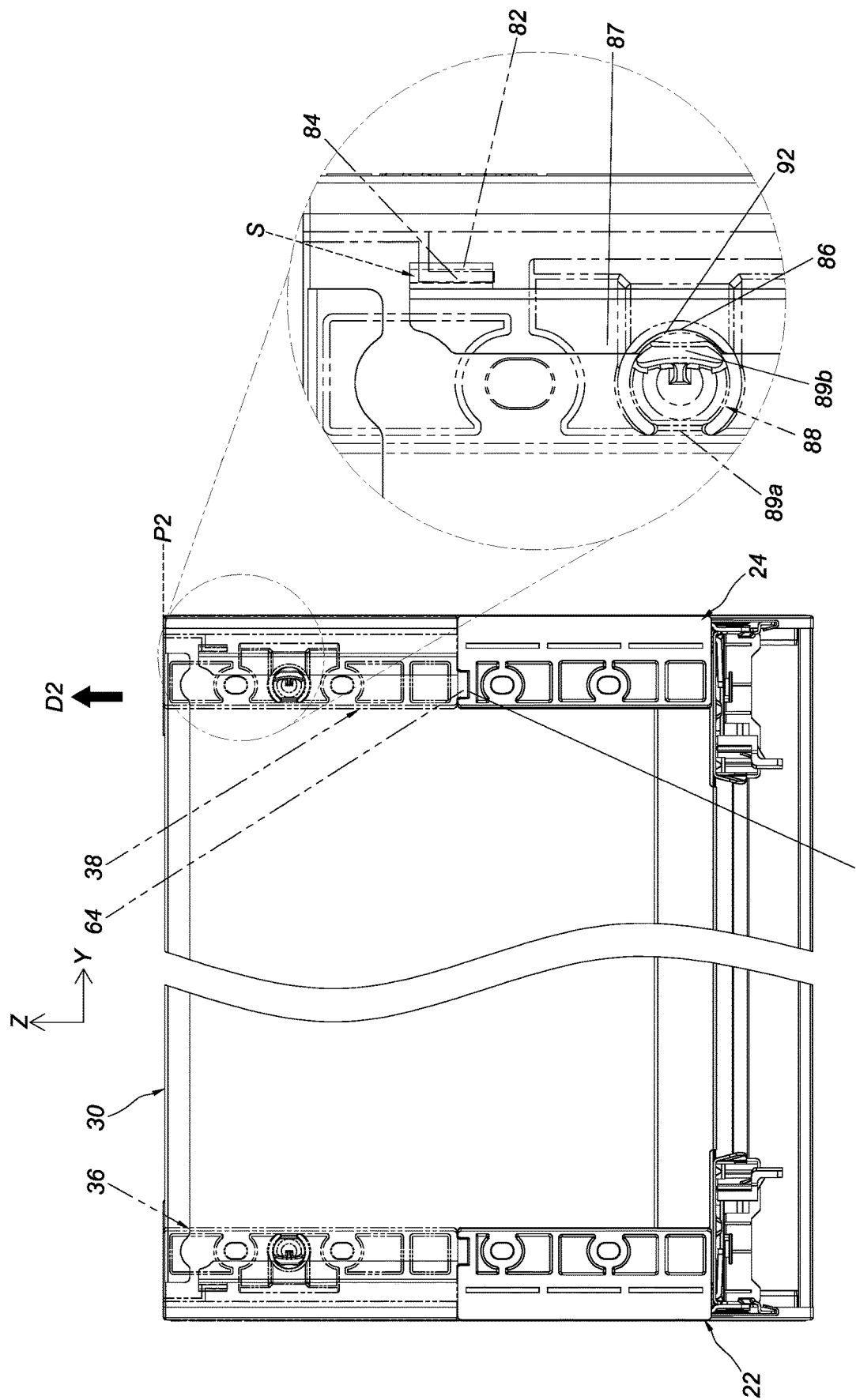
FIG. 14 is a rear view showing the second step of mounting the fittings on the rear panel of the furniture.

Referring to FIG. 13, FIG. 13A, FIG. 14, FIG. 14A, and FIG. 15, when the second fitting 38 reaches the second predetermined position P2 (see FIG. 14) after being moved with respect to the rear panel 30 from the first predetermined position P1 (see FIG. 13) in the first predetermined direction D1, the second engaging structure 84 of the second fitting 38 is mounted to the first engaging structure 82 of the rear panel 30 such that the second engaging structure 84 and the first engaging structure 82 are supported by or abut against each other (see FIG. 14). Moreover, in the course in which the second fitting 38 is moved from the first predetermined position P1 to the second predetermined position P2 in the first predetermined direction D1, the release portion 88 of the second fitting 38 contacts a wall surface of the bent section 87 of the rear panel 30 and hence stores an elastic force (see FIG. 13A), and once the second fitting 38 reaches the second predetermined position P2, the release portion 88 releases the elastic force and is thereby connected to the engaging portion 86 in a releasable manner (see FIG. 14, FIG. 14A, and FIG. 15).

Figure 14A:
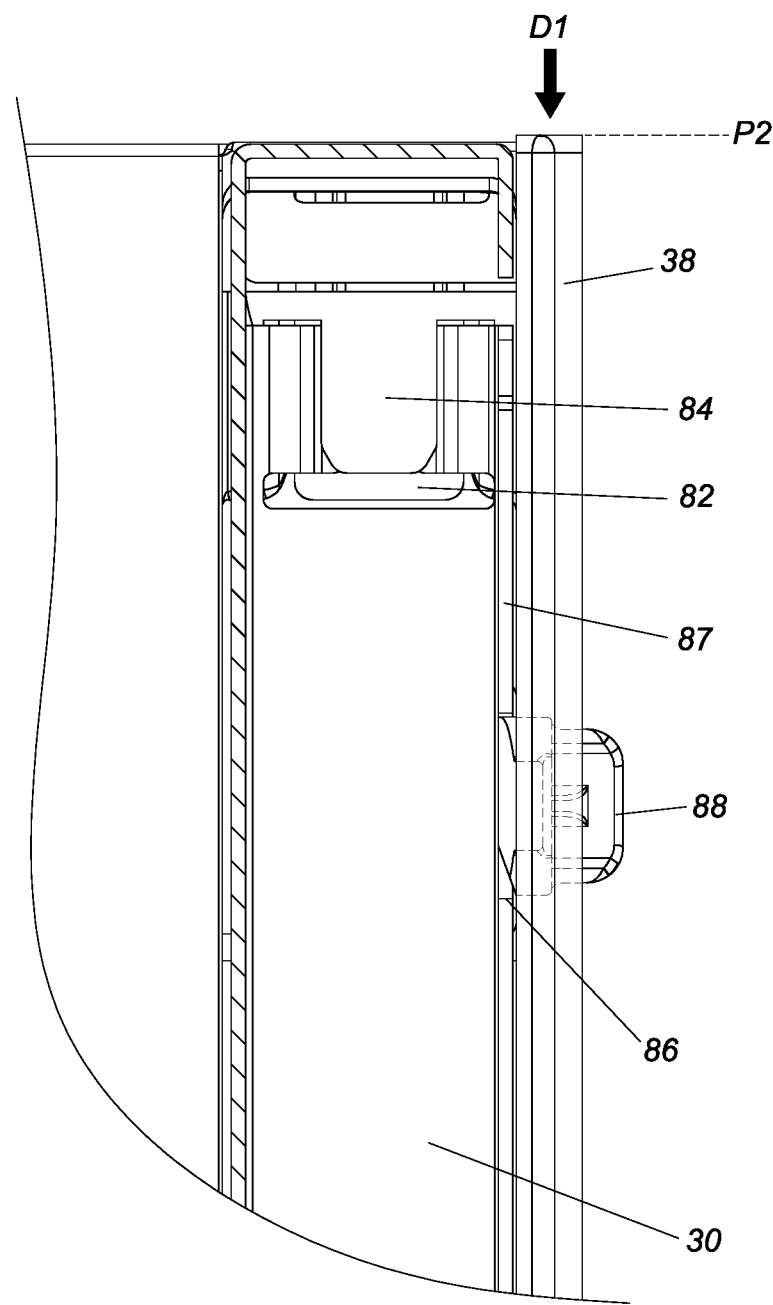
FIG. 14A is a partial side view showing the second step of mounting the fittings on the rear panel of the furniture.
Figure 15:
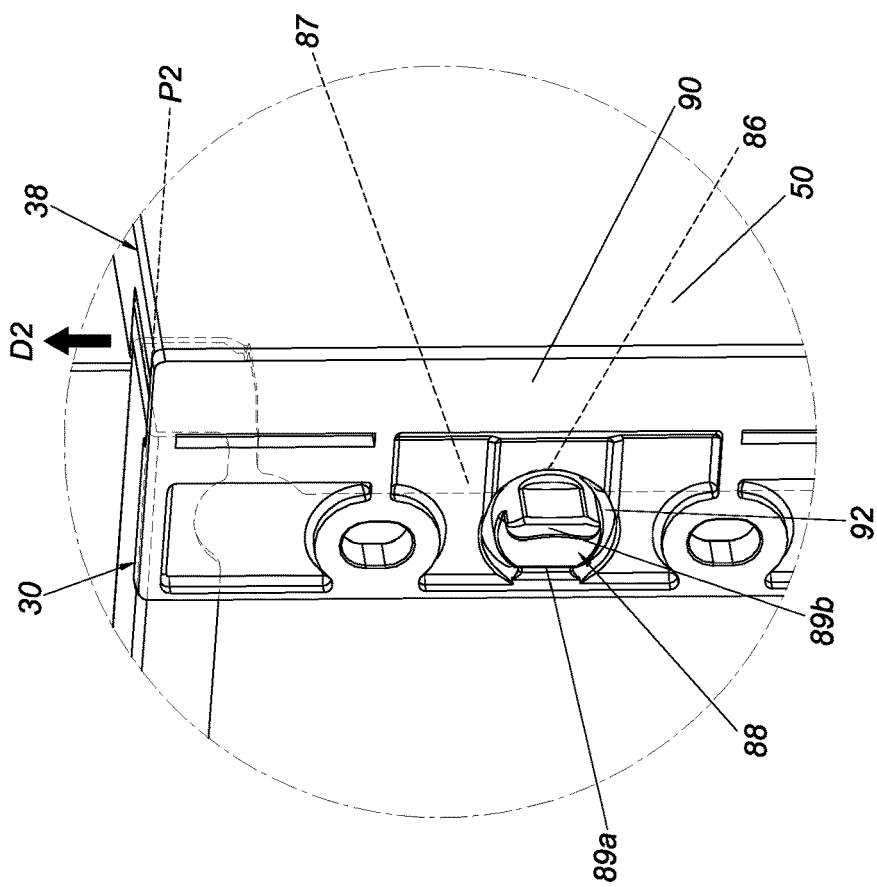
FIG. 15 shows that the fittings are mounted on the rear panel of the furniture, and that the release portion has yet to be operated.

Preferably, when the release portion 88 is connected to the engaging portion 86, the engaging portion 86 corresponds to, or is located in, the engaging space 92 of the auxiliary connecting member 90 such that the release portion 88 and the engaging portion 86 enter a mutually blocking relationship to prevent the second fitting 38 from separating from the rear panel 30 and/or the second sidewall 24 in the second predetermined direction D2 (see FIG. 14, FIG. 14A, and FIG. 15).

It can be known from the above that the second fitting 38 and the second sidewall 24 can be mounted to each other in a detachable manner (see FIG. 7), that the second fitting 38 and the front panel 28 can be mounted to each other in a detachable manner (see FIG. 10 and FIG. 10A), and that the second fitting 38 and the rear panel 30 can be mounted to each other in a detachable manner (see FIG. 14). Based on a similar principle, the first fitting 36 and the first sidewall 22 can be mounted to each other in a detachable manner, the first fitting 36 and the front panel 28 can be mounted to each other in a detachable manner, and the first fitting 36 and the rear panel 30 can be mounted to each other in a detachable manner.

Figure 16:
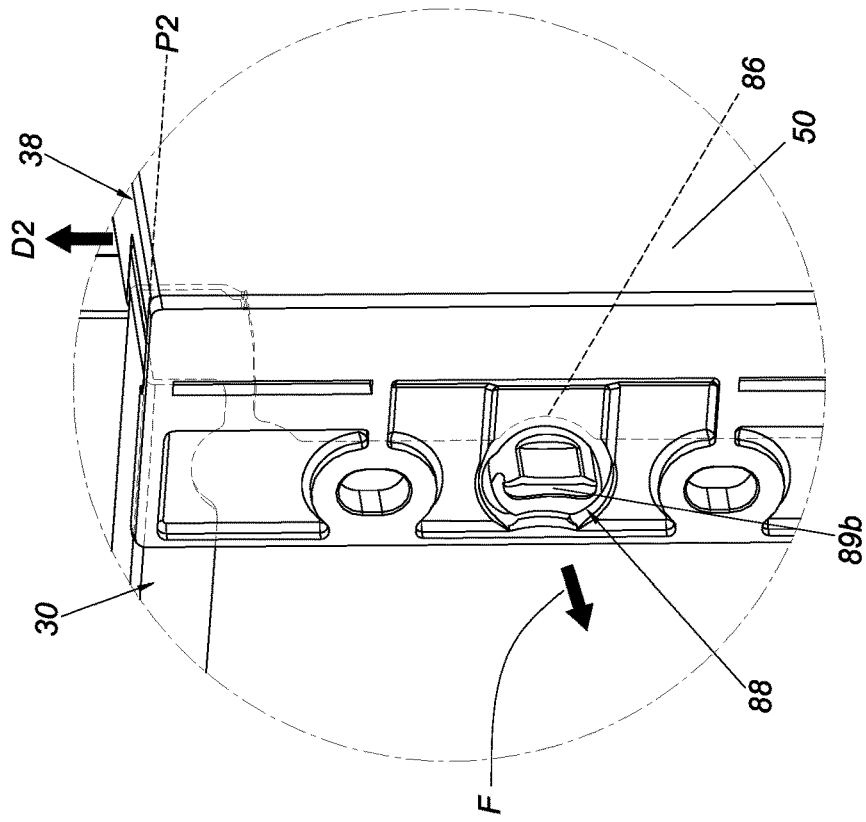
FIG. 16 shows that the fittings are mounted on the rear panel of the furniture, and that the release portion has been operated.

Referring to FIG. 15 and FIG. 16, the second fitting 38 can be detached from the rear panel 30, the second sidewall 24, and the front panel 28 by the following operation procedure:

First, the user applies a force F to the release portion 88 (e.g., the user drives the release portion 88 with the operation section 89b) to terminate the mutually blocking relationship between the release portion 88 and the engaging portion 86 (see FIG. 16), thereby allowing the second fitting 38 to separate from the rear panel 30 in the second predetermined direction D2.

Once the mutually blocking relationship between the release portion 88 and the engaging portion 86 is terminated, referring to FIG. 17, the rear portion 50 of the second fitting 38 can be lifted slightly in the second predetermined direction D2 with respect to the front portion 48 of the second fitting 38 (e.g., the lift being enabled by the flexibility of the materials of, or the assembly gap between, the second fitting 38 and the front panel 28) so that the engaging hook 56 of the first mounting portion 52 of the second fitting 38 is turned by an angle and therefore no longer hooked to the first inner wall 60 of the mounting feature 32a. As a result, the second fitting 38 is allowed to separate from the second sidewall 24 in the second predetermined direction D2 (see FIG. 17) and to separate from the front panel 28 as well (as sequentially shown in FIG. 10A, FIG. 9A, and FIG. 8).

It can be known from the above that the second fitting 38 can be detached from the rear panel 30, the second sidewall 24, and the front panel 28. Based on a similar principle, and as can be understood without further explanation, the first fitting 36 can be detached from the rear panel 30, the first sidewall 22, and the front panel 28.

It is worth mentioning that after the second fitting 38 is detached from the mounting feature 32a of the second sidewall 24, the covering member 34a can be mounted back on the mounting feature 32a in a detachable manner in order to cover the mounting feature 32a and thereby produce a dustproof effect. Similarly, after the first fitting 36 is detached from the mounting feature 32b of the first sidewall 22, the covering member 34b can be mounted back on the mounting feature 32b in a detachable manner in order to cover the mounting feature 32b and thereby also produce a dustproof effect (see FIG. 1).

According to the above, the furniture and the furniture part assembly disclosed in the foregoing embodiment of the present invention preferably have the following features:

1. Each fitting (36 or 38) and the rear panel 30 can be mounted to each other in a detachable manner without using tools (see FIG. 14), each fitting (36 or 38) and the corresponding sidewall (22 or 24) can be mounted to each other in a detachable manner without using tools (see FIG. 7), and/or each fitting (36 or 38) and the front panel 28 can be mounted to each other in a detachable manner without using tools (see FIG. 10 and FIG. 10A).

2. Each covering member (34a or 34b) is detachably mounted on the mounting feature (32a or 32b) of the corresponding sidewall (24 or 22) of the furniture 20, and each covering member (34a or 34b) is configured to cover the corresponding mounting feature (32a or 32b) and thereby produce a dustproof effect.

3. When necessary, each covering member (34a or 34b) can be detached from the mounting feature (32a or 32b) of the corresponding sidewall (24 or 22), and then each fitting (36 or 38) can be detachably mounted to the mounting feature (32b or 32a) of the corresponding sidewall (22 or 24) to add to or increase the height of the corresponding sidewall (22 or 24) of the furniture 20.

While the present invention has been disclosed with reference to the preferred embodiment described above, it is understood that the embodiment is not intended to be restrictive of the scope of the invention. The scope of the patent protection sought by the applicant is defined by the appended claims.

What is claimed is:

1. A furniture part assembly, comprising:
 a fitting having a front portion and a rear portion, said fitting being displaceable from a first predetermined position to a second predetermined position in a first predetermined direction; and
 a rear panel, wherein the rear panel is provided with a first engaging structure, and wherein a second engaging structure is provided adjacent to the rear portion of the fitting and is configured to engage with the first engaging structure and thereby connect the fitting and the rear panel in a detachable manner, wherein one of said first and second engaging structures is configured as a projection member defining a mounting space, wherein another of said first and second engaging structures is configured as an extension member contoured for positioning in said mounting space;

wherein one of the rear panel and the fitting is further provided with an engaging portion, and the other of the rear panel and the fitting is further provided with a release portion configured to connect with the engaging portion in a releasable manner, said release potion including an elastic section, and wherein, when said fitting is being displaced from the first predetermined position to the second predetermined position in the first predetermined direction relative to said rear panel, the extension member and the projection member abut against each other, and said release portion contacts a wall surface of the rear panel via said elastic section and stores an elastic energy, and, wherein, once said fitting reaches said second predetermined position, the release portion releases the stored elastic energy and connects to said engaging portion in the releasable manner.

2. The furniture part assembly of claim 1, further comprising a sidewall, wherein the sidewall includes a bottom portion and a top portion, the top portion has a first predetermined height with respect to the bottom portion, and the top portion is provided with a mounting feature; wherein a covering member is detachably mounted on the mounting feature; and wherein the fitting includes a bottom portion and a top portion, and the bottom portion of the fitting is configured to be mounted to the mounting feature of the sidewall after the covering member is detached from the mounting feature, in order for the fitting to be stacked on the sidewall, and for the top portion of the fitting to have a second predetermined height with respect to the bottom portion of the sidewall, the second predetermined height being greater than the first predetermined height.

3. The furniture part assembly of claim 2, wherein the mounting feature is an aperture, the bottom portion of the fitting is provided with a first mounting portion and a second mounting portion, and the first mounting portion and the second mounting portion are configured to be mounted on a first inner wall and a second inner wall of the aperture respectively.

4. The furniture part assembly of claim 3, wherein the first mounting portion has an engaging hook, and the engaging hook is configured to be hooked to the first inner wall.

5. The furniture part assembly of claim 4, wherein there is a gap between the first mounting portion and the second mounting portion.

6. The furniture part assembly of claim 3, wherein the first mounting portion and the second mounting portion are located adjacent to the front portion of the fitting.

7. The furniture part assembly of claim 6, wherein a first supporting feature is provided adjacent to the rear portion of the fitting, and the sidewall is provided with a second supporting feature configured to support, and be supported by, the first supporting feature.

8. The furniture part assembly of claim 1, further comprising a front panel, wherein one of the front panel and the front portion of the fitting is provided with a first connecting feature, and the other of the front panel and the front portion of the fitting is provided with a second connecting feature for connecting with the first connecting feature.

9. The furniture part assembly of claim 8, wherein the first connecting feature includes a head portion and an extension portion connected to the head portion, the second connecting feature includes an entrance opening and a receiving room in communication with the entrance opening, and the head portion is configured to enter the receiving room through the entrance opening, engage with a predetermined wall in the receiving room, and thereby connect the fitting and the front panel in a detachable manner.

10. A furniture part assembly, comprising:
a fitting, said fitting being displaceable from a first predetermined position to a second predetermined position in a first predetermined direction;

a front panel provided with a first connecting feature, wherein the fitting is provided with a second connecting feature for connecting with the first connecting feature; and a rear panel provided with a first engaging structure, wherein the fitting is provided with a second engaging structure configured to engage with the first engaging structure and thereby connect the fitting and the rear panel, wherein one of said first and second engaging structures is configured as a projection member defining a mounting space, wherein another of said first and second engaging structures is configured as an extension member contoured for positioning in said mounting space;

wherein the rear panel is further provided with an engaging portion, and the fitting is further provided with a release portion configured to connect with the engaging portion in a releasable manner, said release potion including an elastic section, and wherein, when said fitting is being displaced from the first predetermined position to the second predetermined position in the first predetermined direction relative to said rear panel, the extension member and the projection member abut against each other, and said release portion contacts a wall surface of the rear panel via said elastic section and stores an elastic energy, and, wherein, once said fitting reaches said second predetermined position, the release portion releases the stored elastic energy and connects to said engaging portion in the releasable manner.

11. The furniture part assembly of claim 10, further comprising a sidewall, wherein the sidewall includes a bottom portion and a top portion, the top portion has a first predetermined height with respect to the bottom portion, and the top portion is provided with a mounting feature; and wherein the fitting includes a bottom portion and a top portion, and the bottom portion of the fitting is configured to be mounted to the mounting feature in order for the fitting to be stacked on the sidewall, and for the top portion of the fitting to have a second predetermined height with respect to the bottom portion of the sidewall, the second predetermined height being greater than the first predetermined height.

12. The furniture part assembly of claim 11, wherein the mounting feature is an aperture, the bottom portion of the fitting is provided with a first mounting portion and a second mounting portion, and the first mounting portion and the second mounting portion are configured to be mounted on a first inner wall and a second inner wall of the aperture respectively.

13. The furniture part assembly of claim 12, wherein the first mounting portion has an engaging hook, and the engaging hook is configured to be hooked to the first inner wall.

14. The furniture part assembly of claim 13, wherein there is a gap between the first mounting portion and the second mounting portion.

15. The furniture part assembly of claim 12, wherein the first mounting portion and the second mounting portion are located adjacent to a front portion of the fitting, a first supporting feature is provided adjacent to a rear portion of the fitting, and the sidewall is provided with a second supporting feature configured to support, and be supported by, the first supporting feature.

16. A piece of furniture, comprising:
a bottom panel;
a first sidewall and a second sidewall located respectively on a left side and a right side of the bottom panel;
a front panel and a rear panel located respectively on a front side and a rear side of the bottom panel; and
a fitting, said fitting being displaceable from a first predetermined position to a second predetermined position in a first predetermined direction;
wherein the rear panel is provided with a first engaging structure, and the fitting is provided with a second engaging structure configured to engage with the first engaging structure and thereby connect the fitting and the rear panel in a detachable manner, wherein one of said first and second engaging structures is configured as a projection member defining a mounting space, wherein another of said first and second engaging structures is configured as an extension member contoured for positioning in said mounting space;
wherein the rear panel is further provided with an engaging portion, and the fitting is further provided with a release portion configured to connect with the engaging portion in a releasable manner, said release potion including an elastic section, and
wherein, when said fitting is being displaced from the first predetermined position to the second predetermined position in the first predetermined direction relative to said rear panel, the extension member and the projection member abut against each other, and said release portion contacts a wall surface of the rear panel via said elastic section and stores an elastic energy, and, wherein, once said fitting reaches said second predetermined position, the release portion releases the stored elastic energy and connects to said engaging portion in the releasable manner.

17. The piece of furniture of claim 16, wherein one of the front panel and the fitting is provided with a first connecting feature, and the other of the front panel and the fitting is provided with a second connecting feature for connecting with the first connecting feature.

18. The piece of furniture of claim 17, wherein the first connecting feature includes a head portion and an extension portion connected to the head portion, the second connecting feature includes an entrance opening and a receiving room in communication with the entrance opening, and the head portion is configured to enter the receiving room through the entrance opening, engage with a predetermined wall in the receiving room, and thereby connect the fitting and the front panel in a detachable manner.

19. The piece of furniture of claim 16, wherein one of the first sidewall and the second sidewall is provided with a mounting feature, and the one of the first sidewall and the second sidewall is configured to be mounted with the fitting via the mounting feature so that the fitting is stacked on the one of the first sidewall and the second sidewall.

20. The piece of furniture of claim 19, wherein the mounting feature is an aperture, the fitting is provided with a mounting portion configured to be mounted on an inner wall of the aperture, the mounting portion has an engaging hook, and the engaging hook is configured to be hooked to the inner wall.

* * * * *